United States Patent [19]
Morita

[11] Patent Number: 5,164,766
[45] Date of Patent: Nov. 17, 1992

[54] SHUTTER DEVICE

[75] Inventor: Tetsuo Morita, Ohmiya, Japan

[73] Assignee: Fuji Photo Optical Co., Ltd., Ohmiya, Japan

[21] Appl. No.: 799,068

[22] Filed: Nov. 27, 1991

[30] Foreign Application Priority Data

Nov. 28, 1990 [JP] Japan .................. 2-126128[U]

[51] Int. Cl.⁵ .............................................. G03B 27/72
[52] U.S. Cl. .................... 355/71; 354/236; 354/250; 354/261
[58] Field of Search .............. 355/71; 354/236, 250, 354/254, 255, 261

[56] References Cited

U.S. PATENT DOCUMENTS 526,471  9/1894  Waters ........................ 354/254
4,474,464 10/1984  Kanai et al. ................ 355/71

Primary Examiner—Monroe H. Hayes
Attorney, Agent, or Firm—Price, Heneveld, Cooper, DeWitt & Litton

[57] ABSTRACT

A shutter for an objective lens particularly for a photoprinter or the like in which the objective lens must be frequently opened and shut. The shutter includes an arm swingably driven by an actuater and provided at a forward end with a pair of shutter blades. The objective lens is placed in a range over which the pair of shutter blades swing as the arm swings so that the objective lens may be received in a gap defined between this pair of shutter blades and the objective lens may be opened or shut as the arm swings.

8 Claims, 3 Drawing Sheets

SHUTTER DEVICE

BACKGROUND OF THE INVENTION

1. Technical Field

The present invention relates to a shutter device provided in association with an objective lens to expose printing material to a desired quantity of light during a period of exposure but to intercept the light except during said period of exposure, and particularly to such a shutter device suitable to be used with a photoprinter which requires continuous, frequent opening and shutting of the objective lens.

2. Prior Art

The conventional shutter mechanism used with the photoprinter or the like differs from the shutter for photographic cameras in that said shutter mechanism used with photoprinters is opened and shut for each printing cycle, and, particularly in the case of the automatic printer or the like, such shutter mechanism must continuously open and shut at a high frequency. To meet such requirement, there has conventionally been provided before and behind the objective lens shutter blade means adapted to be swingably driven by an actuator such as a rotary solenoid to effect opening and shutting of the objective lens.

If said shutter blade means comprises a single blade, it might be necessitated to use a larger-diametered objective lens and, in addition, exposure for a relatively short time might result in an uneven exposure. Namely, while no problem will be confronted so far as the exposure time is relatively long, if the exposure time is shortened in order to achieve more rapid printing, a time interval for which the shutter blade is being actuated might be longer than a time interval for which the shutter blade is maintained in its fully opened position and, in consequence, there might occur a differential quantity of light transmitted through the objective lens between a location thereof at which said shutter blade begins to be opened and a location thereof at which said shutter blade is fully opened. Such phenomenon might prevent the printing material from being evenly exposed to an original picture and result in uneven distribution of the light.

To minimize such uneven distribution of the light, there has been proposed a shutter device utilizing a pair of shutter blades 1, 2 as shown by FIG. 4 of the attached drawings. These shutter blades 1, 2 are disc-like and formed on forward ends of respective levers 1a, 2a integrally therewith and these levers 1a, 2a are rotatably supported at their longitudinally middle points by shafts 1b, 2b, respectively. The levers 1a, 2a are formed at their other ends with slits 1c, 2c through which driving pins 3a, 4a loosely extend. These driving pins 3a, 4a are supported by rotary solenoids 3, 4, respectively, and swing over a predetermined angle as said rotary solenoids 3, 4 are energized, respectively.

Accordingly, said shutter blades 1, 2 swing over a predetermined angular range around the shafts 1b, 2b, respectively, as the associated rotary solenoids 3, 4 are energized. At a given part of this angular range said shutter blades overlap each other to intercept the light beams which would otherwise be transmitted through an objective lens 5.

Said rotary solenoids 3, 4 rotate in a same direction, more specifically, clockwise from respective positions as shown in FIG. 4 substantially by an angle of 90 degrees so that said shutter blade 1 swings away from the optical path of the objective lens 5 in a direction as indicated by an arrow P while said shutter blade 2 swings away from the optical path of the objective lens 5 in a direction as indicated by an arrow Q. Accordingly, during the period of opening, the objective lens 5 begins to be uncovered from its center toward its opposite side edges following the respective shutter blades 1, 2 swinging away from the center of the objective lens 5. During the period of shutting, the shutter blade 1 swings in the direction opposed to that as indicated by the arrow P while the shutter blade 2 swings in the direction opposed to that as indicated by the arrow Q so that the objective lens 5 is gradually shut from the opposite side edges toward the center thereof.

In this manner, the unevenness of light distribution is alleviated in comparison with the case of said single blade type shutter device.

However, with the conventional shutter device of double blade type as mentioned above, the number of parts increases and the structure becomes complicated, since a pair of shutter blades 1, 2 are separately driven by a pair of rotary solenoids 3, 4, respectively.

Moreover, the space available for installation of these two rotary solenoids 3, 4 prevents the photoprinter or the like from being made compact.

To alleviate the unevenness of light distribution and thereby to stabilize the operation, the pair of shutter blades 1, 2 must synchronously swing. This requirement is met only by a complicated driving circuit which necessarily leads to an increase in cost conjointly with said increased number of parts.

Additionally, it can not be assured that the rotary solenoids 3, 4 evenly operate and therefore the unevenness of light distribution can not be reliably excluded.

Synchronous operation of the pairly provided rotary solenoids 3, 4 makes a correspondingly loud sound and may be a source of undesirable noise.

In view of these problems, it is a principal object of the present invention to provide a shutter device so improved over the prior art that the mechanical structure as well as the driving circuit for the actuator can be simplified, the operation can be stabilized so as to alleviate the unevenness of light distribution more effectively and the photoprinter or the like can be made sufficiently compact.

SUMMARY OF THE INVENTION

The object set forth above is achieved, according to one aspect of the invention, by a shutter device comprising a swingable arm operatively associated with an actuator, a pair of shutter blades appropriately spaced from each other so as to form a gap therebetween and carried by a forward end of said arm, and an objective lens placed in an angular range over which said gap swings as said arm swings, wherein, during a period of light interception, said objective lens is received in said gap and thereby covered by said pair of shutter blades on both front and rear sides of said objective lens.

Preferably, during the period of light interception, approximately one half of said objective lens is covered by said pair of shutter blades or completely covered by said pair of shutter blades on both front and rear sides of said objective lens.

Said object is achieved, according to another aspect of the invention, by a shutter device comprising a swingable arm operatively associated with an actuator, a pair of shutter blades appropriately spaced from each other so as to form a gap therebetween and carried by a forward end of said arm, and an objective lens placed in an angular range over which said gap swings as said arm swings, wherein, during a period of light interception, one half or more of said objective lens is received in said gap and thereby correspondingly covered by one halves or more of said respective shutter blades on both front and rear sides of said objective lens.

Said object is achieved, according to still another aspect of the invention, by a shutter device comprising a pair of swingable arms operatively associated with respective actuators, a pair of shutter blades appropriately spaced from each other so as to form a gap therebetween and carried by a forward end of each said arm, an objective lens placed in an angular range over which the gaps defined by the respective pairs of shutter blades swing as the respective arms swing, wherein the gaps defined by the respective pairs of shutter blades carried by the respective arms are so dimensioned that said gap defined by the one pair of shutter blades carried by the one arm may receive the other pair of shutter blades carried by the other arm and wherein, during a period of light interception, one half or more of said objective lens is covered by all the shutter blades carried by said pair of arms on both front and rear sides of said objective lens, or wherein the shutter blades carried by the one arm and the shutter blades carried by the other arm may alternately overlap one another and wherein, during a period of light interception, one half or more of said objective lens is covered by all the shutter blades carried by said pair of arms on both front and rear sides of said objective lens.

Preferably, the pair of actuators are displaced from each other by an appropriate angular distance around the objective lens and said pair of arms are swingably driven by the associated actuators, respectively, in a same direction.

Preferably, the pair of actuators are displaced from each other by an appropriate angular distance around the objective lens and said pair of actuators are swingably driven by the associated actuators, respectively, in opposite directions.

According to the present invention, the light interception occurs with said shutter blades overlapping said objective lens on the front and rear sides, respectively. At this moment, the light beams projected toward said objective lens are partially intercepted by the shutter blade lying before said objective lens and can not reach the printing material or the like. The portion of the light beams having been transmitted through the objective lens is intercepted by the shutter blade lying behind said objective lens and can not reach the printing material or the like.

BRIEF DESCRIPTION OF THE DRAWINGS

A preferred embodiment of the shutter device constructed according to the teachings of the invention and incorporated in a photoprinter is shown by the attached drawings, in which:

FIGS. 2 and 3 are schematic side views which illustrate the light exposure and interception, in which FIG. 2 illustrates shutter blades partially covering an objective lens and FIG. 3 illustrates the shutter blades covering one half of the objective lens.

DETAILED DESCRIPTION OF THE INVENTION

Figure 1:
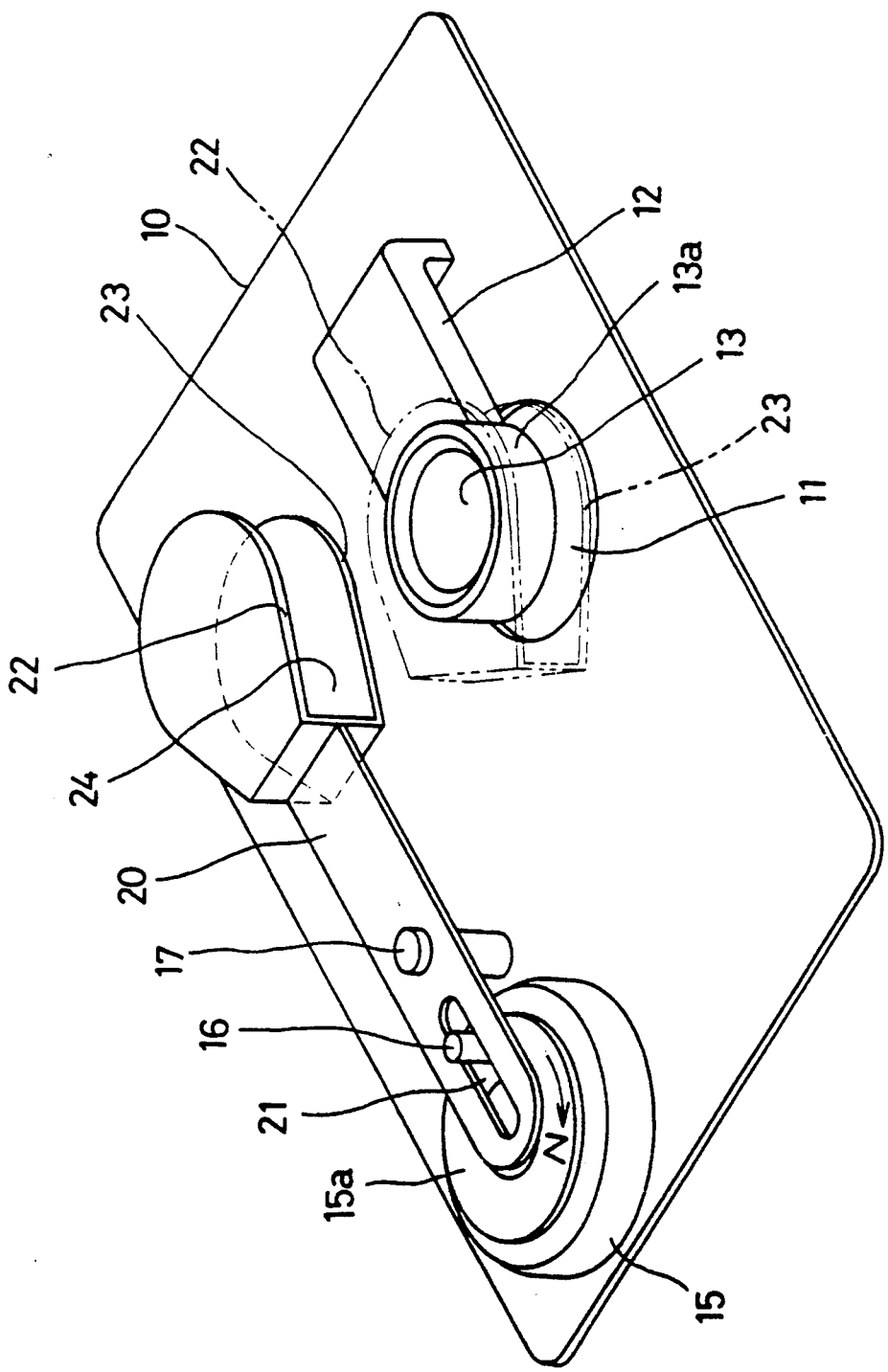
FIG. 1 is a schematic perspective view of the shutter device, indicating a position for light exposure by solid line and a position for light interception by imaginary line.

The shutter device constructed according to the present invention will be described in detail by way of example with reference to FIG. 1 illustrating this specific embodiment as being actually incorporated in a photoprinter.

A base plate 10 is centrally formed with a through-hole 11. A supporting arm 12 bent substantially in L-shape is secured at its base end to an upper surface of said base plate 10 and carries at its other end an objective lens 13 held by a lens mount 13a so that said objective lens 13 is centered above said through-hole 11.

The base plate 10 is provided at one corner thereof with a rotary solenoid 15 serving as an actuator. This rotary solenoid 15 is adapted to rotate a rotor 15a substantially by an angle of 90 degrees, for example, in a manner that said rotor 15a is rotated from its original position by 90 degrees upon energization of the rotary solenoid 15 and returns to said original position upon deenergization of said rotary solenoid 15. A drive pin 16 is planted on said rotor 15a and extends upward.

A supporting shaft 17 is planted on the base plate 10 at an appropriate position and an arm 20 is swingably supported at the middle by said supporting shaft 17.

Said arm 20 is formed at one end thereof with a longitudinal slit 21 through which said drive pin 16 slidably extends. The arm 20 carries at the other end thereof a pair of shutter blades 22, 23. These shutter blades 22, 23 are spaced from each other by a distance slightly larger than a length of said objective lens 13 as measured in a direction of the optical axis and respectively dimensioned to be capable of covering at least one half of the objective lens 13. It should be understood that the embodiment illustrated by FIG. 1 has the shutter blades 22, 23 dimensioned to cover entirely the objective lens 13.

As indicated by an imaginary line in FIG. 1, the objective lens 13 is received in a gap 24 defined between said shutter blades 22, 23 as said arm 20 swings around the supporting shaft 17, and thereby the light which otherwise would be transmitted by said objective lens 13 is intercepted. It should be understood that the position of the shutter blades 22, 23 as indicated by the imaginary line is assumed here as the original position thereof.

Figure 2:
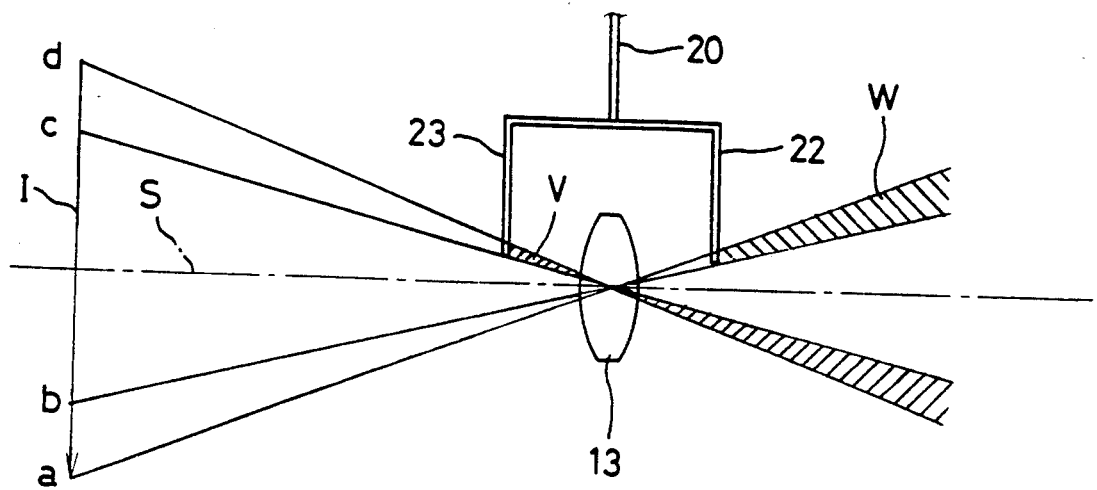
Figure 3:
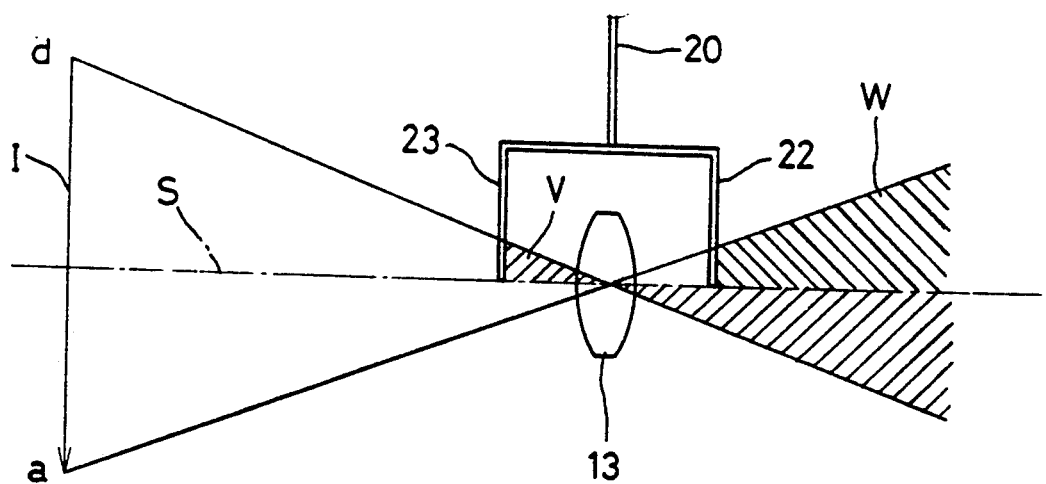
Figure 4:
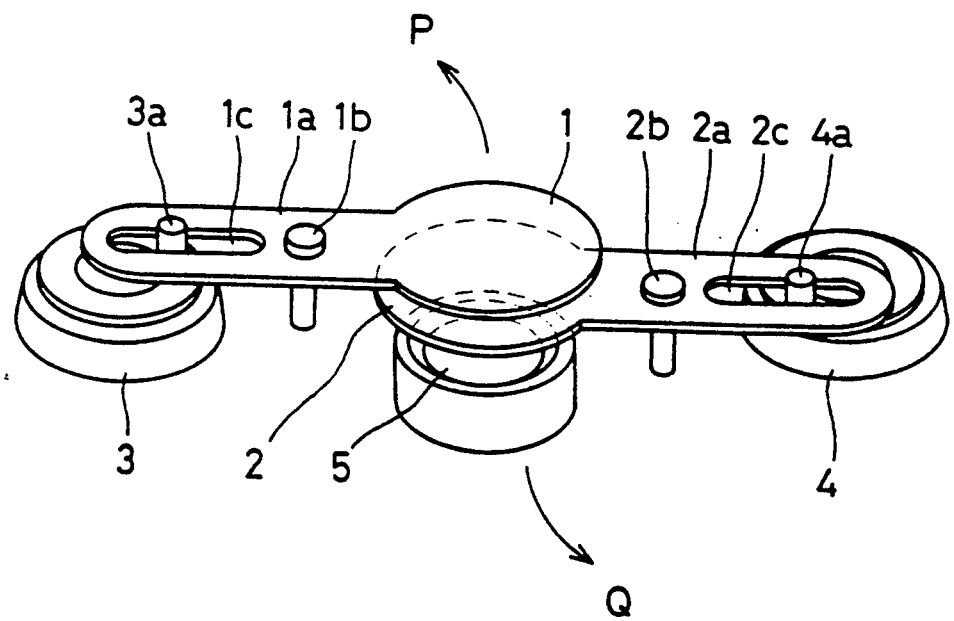
FIG. 4 is a schematic perspective view showing by way of example a prior art shutter device.

FIG. 2 illustrates a state in which the objective lens 13 is partially covered by the shutter blades 22, 23 and FIG. 3 illustrates a state in which just a half of the objective lens 13 is covered by the shutter blades 22, 23. Referring to FIGS. 2 and 3, reference symbol I designates a picture on a photographic negative to be printed. Printing paper as photosensitive material is placed at a position opposed to this picture I with the objective lens 13 between. Reference numeral S designates the optical axis.

The shutter device constructed as has been described above operates as follows for exposure as well as interception.

With the photographic negative carrying the picture I to be printed being held at a predetermined position and the printing paper on which said picture I is to be printed being set at a predetermined position, illumination is directed through the photographic negative toward the objective lens 13. Then the rotary solenoid 15 is energized to rotate the rotor 15a clockwise as indicated by an arrow N and thereby to rotate the drive pin 16 also in the same direction. Rotation of this drive pin 16 causes the arm 20 to swing around the supporting shaft 17 counterclockwise as viewed in FIG. 1, since the drive pin 16 loosely extends through the slit 21. Consequently, the shutter blades 22, 23 carried by the forward end of said arm 20 swing from their original position as indicated by the imaginary line in FIG. 1 to their position as indicated by a solid line in the same figure to uncover the objective lens 13. Thus the photosensitive material is exposed to the picture I and a desired print is obtained.

After a predetermined time has elapsed, the rotary solenoid 15 is deenergized to rotate the rotor 15a in the opposite direction (with respect to the direction as indicated by the arrow N) to its original position. Such rotation of the rotor 15a causes the arm 20 to swing around the supporting shaft 17 clockwise and, consequently, the shutter blades 22, 23 swing from the position as indicated by the solid line in FIG. 1 to the position as indicated by imaginary line in the same figure. Thus, the objective lens 13 is received in the gap 24 defined between the shutter blades 22, 23 and said objective lens 13 is isolated from the light.

The optical exposure and interception will be described in reference to FIGS. 2 and 3.

Referring to FIG. 2, the objective lens 13 which has been exposed to the picture is now partially covered by the shutter blades 22, 23 being on way to their original position. At this moment, the beam of light directed from a portion of the picture I defined between points c and d toward the objective lens 13 is intercepted by the forward end of the shutter blade 23 which is in front of said objective lens 13 and therefore cannot reach the printing paper, as indicated by hatches V in FIG. 2. On the other hand, the beam of light directed from a portion of the picture I defined between points a and b toward the objective lens 13 passes through the center of said objective lens 13. However, this beam of light is intercepted by the forward end of the shutter blade 22 and therefore cannot reach the printing paper, as indicated by hatches W in FIG. 2. It should be understood that said points c and b represent the points at which straight lines connecting the forward ends of the shutter blades 22, 23 to the center of the objective lens 13 intersect the picture I, respectively.

In this manner, the printing paper is exposed to the portion of the picture I defined between the points b and c and the beam of light coming from the remainder of the picture I is intercepted at the moment as illustrated by FIG. 2.

As the rotary solenoid 15 continues to rotate and thereby causes the shutter blades 22, 23 to swing further, a state is reached in which just a half of the objective lens 13 is covered by said shutter blades 22, 23, as illustrated by FIG. 3. At this moment, a beam of light coming from a portion of the picture defined between the point a and the optical axis S is transmitted through the objective lens 13, but thereafter intercepted by the shutter blade 22, as indicated by hatches W in FIG. 3, and cannot reach the printing paper. On the other hand, a beam of light coming from a portion of the picture defined between the optical axis S and the point d is intercepted by the shutter blade 23 prior to incidence upon the objective lens 13, as indicated by hatches V in FIG. 3 and cannot reach the printing paper.

Accordingly, at the moment when just a half of the objective lens 13 is covered by the shutter blades 22, 23, all the beams of light coming from the picture I are intercepted and no printing thereof on the printing paper is achieved.

In other words, the mechanism of the present invention is arranged so that the light exposure occurs as the completely covered objective lens 13 are gradually uncovered from the center to the opposite side edges thereof and the light interception occurs as the completely uncovered objective lens 13 is gradually covered from the opposite side edges to the center thereof. Such arrangement results in alleviating the problem of uneven exposure the conventional shutter device having a single shutter blade has been unable to solve.

While the invention has been described and illustrated hereinabove in connection with a specific embodiment of the shutter device which is equipped with a single mechanism adapted to drive the arm 20 carrying a pair of shutter blades 22, 23 by the rotary solenoid 15, it is possible without a departure from the scope of the invention to provide a pair of such mechanisms so that the objective lens may be covered by two pairs of shutter blades arranged before and behind said objective lens, respectively, and each pair of shutter blades may swing in directions so as to intersect each other. This alternative embodiment will make the exposure more even, because the objective lens will be gradually uncovered from the center to the peripheral edge of said objective lens.

Although the objective lens 13 has been described and illustrated as comprising a single lens having front and rear principal points falling in the optical axis with each other in order to simplify the description, the objective lens may be a composite lens. Obviously, the front principal point will not be in line with the rear principal point in such composite lens.

EFFECT OF THE INVENTION

As will be apparent from the foregoing description, the shutter device of the invention is adapted to cover the objective lens by receiving said objective lens in the gap defined between a pair of shutter blades which can be driven by the single actuator. Such feature not only allows the number of parts to be reduced but also allows a cost of the photoprinter or the like into which the shutter device of the invention is incorporated to be reduced because a single driving circuit suffices for the actuator. Said feature of the invention that a pair of shutter blades can be simultaneously driven by the single actuator advantageously provides a structural simplification as well as stabilized operation of the shutter device and thus allows the photoprinter to achieve a stabilized printing.

Additionally, the shutter device can be free from an adverse affection which otherwise might occur when the shutter blades are respectively driven by separate actuators.

Owing to another important feature of the invention that the single actuator drives a pair of shutter blades each dimensioned to cover just one half of the objective lens, the weight the actuator must drive is substantially equal to that of a single shutter blade dimensioned to cover the whole objective lens and it is unnecessary to employ a bulky actuator. With an advantageous consequence, a space required for installation of the shutter device can be reduced and the photoprinter or the like equipped with this shutter device can be made correspondingly compact.

Use of the single actuator which may be relatively compact allows a sound of operation to be effectively suppressed and a noise generation to be minimized.

What is claimed is:

1. A shutter device comprising a swingable arm operatively associated with an actuator, a pair of shutter blades appropriately spaced from each other so as to form a gap therebetween and carried by a forward end of said arm, and an objective lens placed in a range over which said gap swings as said arm swings, such that during a period of light interception, said objective lens is received in said gap and thereby covered by said pair of shutter blades on both the front side and the rear side of said objective lens, respectively.

2. The shutter device as recited in claim 1, wherein, during the period of light interception, approximately a half of said objective lens is covered on both the front side and the rear side of said objective lens, respectively, by said pair of shutter blades.

3. The shutter device as recited in claim 1, wherein, during the period of light interception, said objective lens is completely covered by said pair of shutter blades on both the front side and rear side of said objective lens, respectively.

4. A shutter device comprising a swingable arm operatively associated with an actuator, a pair of shutter blades appropriately spaced from each other so as to form a gap therebetween and carried by a forward end of said arm, and an objective lens placed in a range over which said gap swings as said arm swings, wherein, during a period of light interception, one half or more of said objective lens is received in said gap and thereby correspondingly covered by one half or more of said pair of shutter blades on both the front side and the rear side of said objective lens, respectively.

5. A shutter device comprising a pair of swingable arms operatively associated with respective actuators, a pair of shutter blades appropriately spaced from each other so as to form a gap therebetween and carried by a forward end of each said arm, an objective lens placed in a range over which the gaps defined by the respective pairs of shutter blades swing as the respective arms swing, wherein the gaps defined by the respective pairs of shutter blades carried by the respective arms are so dimensioned that said gap defined by the one pair of shutter blades carried by the one arm may receive the other pair of shutter blades carried by the other arm and wherein, during a period of light interception, one half or more of said objective lens is covered by all the shutter blades carried by said pair of arms on both the front side and the rear side of said objective lens.

6. A shutter device comprising a pair of swingable arms operatively associated with respective actuators, a pair of shutter blades appropriately spaced from each other so as to form a gap therebetween and carried by a forward end of each said arm, an objective lens placed in a range over which the gaps defined by the respective pairs of shutter blades swing as the respective arms swing, wherein the shutter blades carried by the one arm and the shutter blades carried by the other arm may alternately overlap one another and wherein, during a period of light interception, one half or more of said objective lens is covered by all the shutter blades carried by said pair of arms on both the front side and the rear side of said objective lens.

7. The shutter device as recited in claims 5 or 6, wherein the pair of actuators are displaced from each other by an appropriate angular distance around the objective lens and said pair of arms are swingably driven by the associated actuators, respectively, in a same direction.

8. The shutter device as recited in claims 5 or 6, wherein the pair of actuators are displaced from each other by an appropriate angular distance around the objective lens and said pair of actuators are swingably driven by the associated actuators, respectively, in opposite directions.

* * * * *